Oct. 31, 1950   A. E. K. STADLER   2,527,593
SELECTIVE, CONTINUOUS SPECTRUM, SPECTRAL
POLARIZING COLOR DEVICE

Filed April 20, 1948   2 Sheets-Sheet 1

INVENTOR.
ALOIS E. K. STADLER
BY
Kenyon & Kenyon
ATTORNEYS

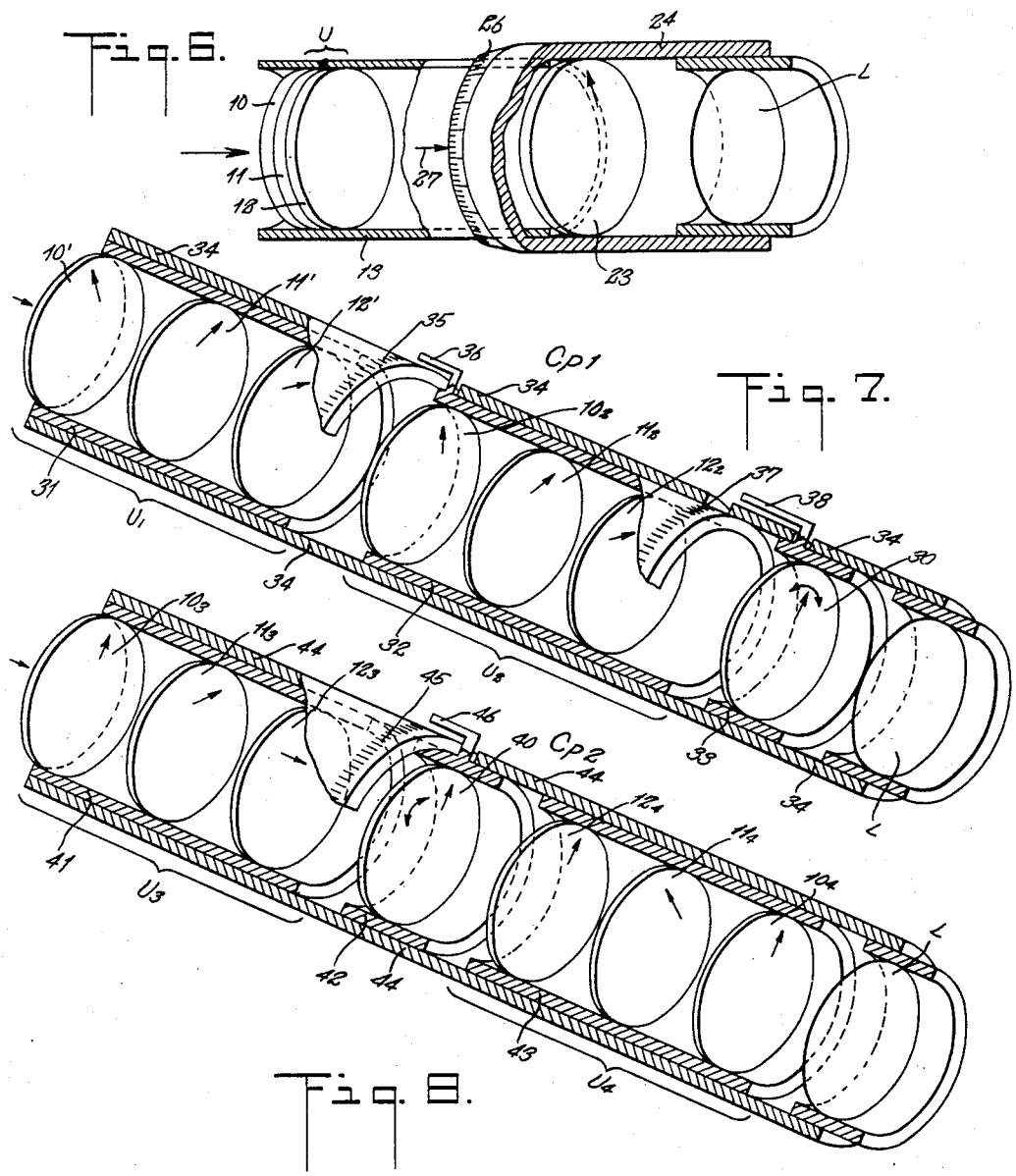

Patented Oct. 31, 1950

2,527,593

UNITED STATES PATENT OFFICE 2,527,593

SELECTIVE, CONTINUOUS SPECTRUM, SPECTRAL POLARIZING COLOR DEVICE

Alois E. K. Stadler, New York, N. Y.

Application April 20, 1948, Serial No. 22,084

10 Claims. (Cl. 88—65)

This invention relates to light filters and more specifically to light filters of the type which utilize the phenomena of polarization and rotation of light rays. This application is a continuation-in-part of my copending application Serial No. 581,732, filed March 9, 1945, now abandoned.

Among the objects and features of this invention are to provide devices of this character which will function as a selective, continuous spectrum, spectral color filter for use in photography and for other purposes.

Another object and feature of this invention is to provide a filter construction useful particularly in photography to produce a contrast reducing effect whereby novel photographic effects may be produced both in color and in black and white photographic work.

A further object and feature of the invention is to provide devices of the character described that are simple to construct and operate and which will efficiently perform the purposes for which they are intended.

Still a further feature and object of the invention is to provide novel compound filters useful in photography and other processes involving the control of various properties of light.

Other objects, features and advantages of the invention will become apparent from the following description and accompanying drawings wherein:

Fig. 6 is a perspective view of a selective, continuous spectrum, spectral color filter embodying the invention for use with a camera;

Fig. 7 is a perspective exploded view of a compound selective, continuous spectrum, spectral color filter embodying the invention; and Fig. 8 is a perspective exploded view of a modified form of compound filter.

Basically the invention contemplates the use of polarizing elements of transparent material in combination with birefringent elements also of transparent material also known as retardation elements. While the properties of polarizing elements themselves and of retardation elements themselves are known generally, it has not been known prior to the invention of this application that critical dimensional factors are involved in combining and arranging these elements in such a way as to provide a structure whereby the rays of the entire range of color components of transmitted rays of a white light beam may be individually plane polarized and have their planes of polarization arranged in different directions and in spectral succession according to their different wave lengths so that with the aid of a polarization element called an analyzer which has its plane perpendicular to the direction of the beam, a color filter is produced which will permit maximum transmission only of such color of light which has its plane of polarization parallel to the analyzing axis of the analyzer and which will not permit transmission of such color of light which has its plane of polarization substantially perpendicular to the analyzing axis of the analyzer and which upon rotation of said analyzer in its plane will change its transmission property in spectral succession, making it possible to use the arrangement as a selective, continuous spectrum, spectral color filter for photographic or other purposes.

When the structure is used with an analyzer as outlined, it becomes a selective, continuous spectrum, spectral color filter. When used without an analyzer, it is a producer of spectral polarized light useful as a contrast reducing device and of particular application in photography as will be described. When several such structures are combined as will be described together with an analyzer or analyzers compound selective, continuous spectrum, spectral color filters of specific applicability are the results.

The polarizing elements are of any desirably polarizing material and preferably in sheet form. Such materials are sheet-like elements comprising a set medium such as cellulose acetate in which are fixedly suspended a plurality of polarizing particles such as alkyloidal iodine crystals having their polarizing axes all aligned.

The retardation elements are birefringent materials in sheet-like form and may be of mica, suspensions of double-refracting particles with uniformly oriented axes, transparent regenerated cellulose known as cellophane or other transparent cellulosic or other materials possessing birefringent properties. In addition, these retardation elements or combinations thereof require critical dimensions as will be described as to thickness to satisfy the conditions of the invention.

Figure 1:
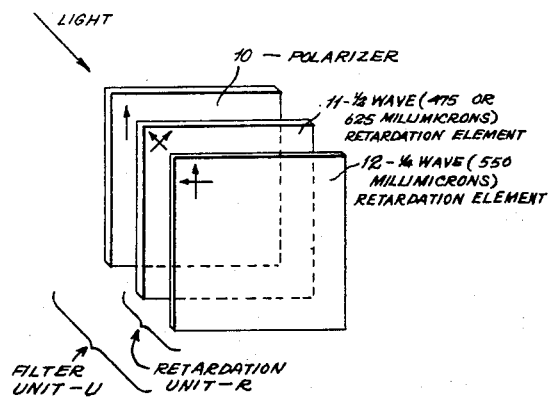
Fig. 1 is a diagrammatic, exploded perspective view of a device for producing spectrally polarized light and embodying the invention.

Referring first to Fig. 1, 10 denotes a polarizer element consisting of a sheet of polarizing material of the character described. 11 denotes a one-half wave length retardation element consisting of a sheet or laminae of sheets of birefringent sheet material of the character described. The overall dimensions of thickness of this sheet are critical and to meet requirements the overall thickness of a sheet or of laminae of such sheets is one which provides a half wave element which introduces a relative phase difference of exactly a half period between the two components of polarized light traversing it when the wave length of the light either is 475 millimicrons or 625 millimicrons wave length. The birefringent sheets or laminae of sheets of element 11 have two axes of transmission, one of which is known as the "principal or significant axis." The two axes are at right angles to each other and are oriented at 45° with respect to the polarizing axis of the polarizer 10. If retardation element 11 consists of laminae of sheets rather than a single sheet, the respective two axes of all the sheets are arranged in parallelism and all at 45° with respect to the polarizing axis of the polarizer 10. The plane of this element 11 is parallel to the plane of polarizer element 10.

A second retardation ¼ wave length element 12 consisting of a sheet or laminae of sheets of birefringent sheet materials of the character described is positioned in front of element 11 with its planes parallel thereto. The overall dimensions of this element are critical. To meet critical requirements, the overall dimensions of a sheet or laminae of such sheets is one which provides a ¼ wave element which introduces a relative phase difference of exactly one quarter period between the two components of polarized light traversing it when the wave length of light is 550 millimicrons. It is to be noted that the ½ wave length retardation element is for light whose wave length is approximately 75 millimicrons different from that of the ¼ wave length retardation element, being either for light of approximately 475 millimicrons (550—75) or 625 millimicrons (550+75).

The two principal axes of transmission of the sheets or laminae of sheets of element 12 are at right angles and are oriented at 45° to the principal axes of the ½ wave retardation element 11.

The half wave element 11 will hereinafter be termed a "½ wave retardation element (475 or 625 millimicrons)." The quarter wave element 12 will hereinafter be termed a "¼ wave retardation element (550 millimicrons)."

While the polarizer 10, ½ wave retardation element (475 or 625 millimicrons) 11 and ¼ wave retardation element (550 millimicrons) 12 are illustrated in Fig. 1 as in parallel planes and spaced apart, in practice, they may be mounted as a unit in surface contact with each other or separated as desired.

An assembly of the two retardation elements 11 and 12 will hereafter be referred to as a "retardation unit" R. An assembly of a retardation unit R with a polarizer 10 will hereinafter be referred to as a "filter unit" U.

Figure 2:
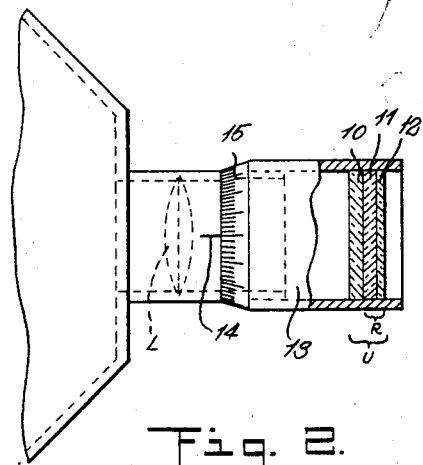
Fig. 2 is a sectional view of a spectral polarizer like that of Fig. 1 constructed for application in front of the lens of a camera.

A filter unit U of the character described is useful per se. For example, if such a unit is mounted in a tubular frame 13 (Fig. 2), and the frame 13 applied in front of a camera lens L with the planes of the unit U perpendicular to the focal axis of the lens and with the polarizing element 10 nearest to the lens, so that light passes through elements 12, 11 and 10 in the order named, the unit U functions as a spectro color-glare filter to provide a desired contrast reducing effect. Thus, by rotating the planes of the unit U in either direction about the focal axis of the lens L different novel contrast reducing effects and glare reduction can be secured. For example, if there is a blue haze in the atmosphere, a color picture taken without the unit U will show loss of color for distant objects while tree foliage will be rendered blue green rather than with natural green coloration. The application of the unit U to the lens as described and the rotation thereof to position the polarizing axis of polarizer 10 approximately 165° from vertical in counterclockwise direction, a color correcting tinting effect will be created by the unit which will compensate for the blue glare rays and as a result the exposed pictures will be rendered in approximately natural color. A warm picture condition resulting from yellow orange haze can be corrected to render natural color by rotation of the polarizing axis of polarizer 10 of unit U counterclockwise approximately 75° from vertical. A sunset effect in a photograph taken against the sun can be compensated for red glare or haze by rotation of the axis of polarizer 10 of unit U clockwise approximately 45° from vertical. An approximate reference mark 14 on the camera and marked indicia 15 on the frame serve to advise the user of the different positions of the polarizing axis of the polarizer 10 of the unit to facilitate ready positioning of the axis position to meet desired conditions.

The combined ½ wave (475 or 625 millimicrons) retardation element 11 and ¼ wave (550 millimicrons) retardation element 12, i. e. the retardation unit R, act to rotate the planes of light of different wave lengths different amounts or in different directions, and the amount and the direction of rotation which light of a given wave length experiences is constant irrespective of the side from which the light is transmitted through the said unit and irrespective of the direction of polarization which the transmitted light has. The rotation difference between polarized light rays of different wave length is, therefore, also constant and depends upon the wave length difference of the light rays and is with the unit R, 180° between the longest and shortest wave lengths of the visible spectrum.

The retardation unit R, therefore, resolves every polarized ray of light into what may be described as spectral polarized light. Such light vibrates in all directions perpendicular to its direction of propagation and differs from ordinary light only because it has its planes of vibration arranged in continuous spectral order within an angle of 180° or twice within a circle. Such vibration arrangement of light may also be described as a polarized spectrum.

When a polarizing element 10 is combined with the unit R and light is transmitted to pass first through the unit R and then the polarizing element 10, the latter functions as an analyzer. Since glare is reflected light and reflected light is polarized light whose direction of polarization is parallel to the reflecting surface, the passage of glare rays (polarized light rays) through the retardation unit causes the latter to act such that every glare ray transmitted is spectrally polarized and vibrates in all directions. The transmission then of the spectrally polarized glare rays through the polarizing element 10 acting as an analyzer decreases the intensity of every glare ray to one half of its original intensity.

The result of this is that the unit U which is a combination of retardation unit R and polarization element 10, eliminates the ill effects of all glare rays irrespective of their direction of polarization. Photographs taken with a unit U before the lens L, therefore, show perfect detail rendition in all glare-producing areas being photographed as well as greater color saturation when a color film is used.

However, because the unit U acts only to eliminate the ill effects of reflected light due to glare, without absorbing such light completely mirror images resulting from reflected light are not destroyed on passage through the unit U and photographs taken with such a unit in place represent a true rendition of the scene photographed.

It is well known that dust particles and water vapor in the air scatter light. Depending upon the time of day and the atmospheric conditions such as temperature and humidity, a certain wave length of scattered light predominates in intensity and as a result the scattered light shows then a particular tone or hue which may be described as atmospheric tone. A bluish tone indicates a low temperature, whereas an orange tone indicates a rather high temperature while greyish or purplish tones indicate high humidity and a yellowish tone low humidity and a reddish tone a time near sunset.

These tones are mirrored in nature by many reflecting surfaces and surface areas. Consequently, not only the sky and atmosphere show the prevailing atmospheric tone, but the reflecting surfaces and surface areas do likewise. The scattered or reflected light is the only light in nature that is partially or wholly polarized. All other light is ordinary light.

Since the unit U is active only towards polarized light, it is active only in nature towards reflected light or the polarized portions of scattered light.

Since the amount and direction of rotation which the plane of polarized light of any given wave length of scattered or reflected light transmitted by the retardation unit R is constant, a ray of reflected or scattered polarized light passing through the unit R is resolved into a spectral polarized ray and rotation of unit R in its own plane causes no change in directions of polarization of the spectrally polarized rays transmitted. However, the polarizing element 10 through which the spectrally polarized rays from unit R must pass is selective in its intensity transmission characteristics depending upon the orientation of its polarizing axis relative to the directions of polarization of the rays entering unit R, a change of angular position of the combined unit U which necessarily results in a change of angular position of the polarizing axis of polarizing element 10 renders the hue or tone of the light transmitted to the lens which corresponds to the hue of such wave length of light entering the unit R as has its direction of polarization parallel to the polarizing axis of the polarizing element 10.

The saturation of that emerging tone or hue entering the lens then depends upon the degree to which scattered or reflected light is polarized and may be a faint tint or a saturated color. Since the direction of spectral polarization of unit R remains constant when the filter is rotated in its own plane, it is possible for the unit U to be used to duplicate any desired atmospheric tone by simply setting the axis direction of the polarizing axis of element 10 for a desired atmospheric tone by use of the reference mark 14 and indicia 15 of Fig. 2.

Since the unit U is not active toward ordinary unpolarized light, its use does not degrade or distort true colors of objects as would be the case with ordinary color filters. Thus, in still or motion picture photography, the photographer may express his own artistic note in a color photograph simply by desired angular positioning of the unit U in front of the lens. The scene can be rendered in many different ways and provided with a desired pleasing atmospheric tone. It can be used in motion picture color photography to gradually change the atmospheric tone while shooting the scene, and also to duplicate changes in atmospheric tone prevalent during sunset or on the approach of a storm.

Figure 3:
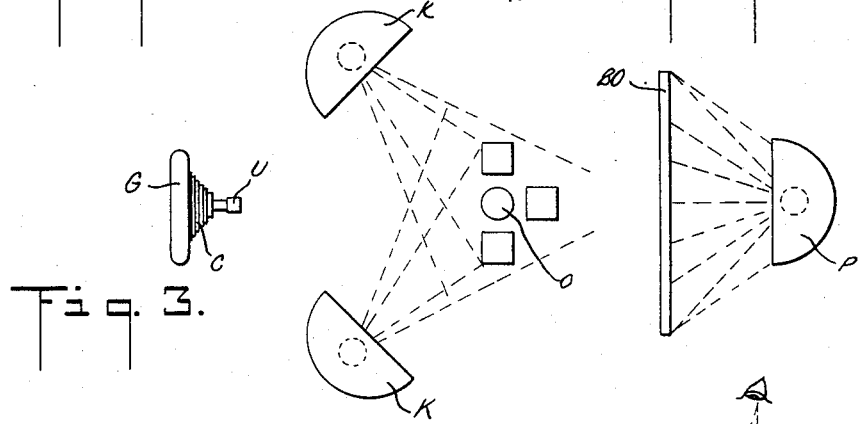
Fig. 3 is a diagrammatic view illustrating a use for the device of Figs. 1 and 2.

Use of the unit U improves color rendition of foliage and grass in color photographs because reflected light from surface moisture or dust, etc., thereon are polarized glare rays which are minimized as described by the action of the unit U. Since the glare rays are minimized a better green rendition of foliage and grass and the elimination of washed out areas due to reflections results. The unit U mounted as described on a camera C (Fig. 3) can be used in photographic studios to obtain colored backgrounds by positioning a transparent screen 20 behind the objects O being photographed and projecting polarized light from a source P onto the screen 20 from behind it. Then simple rotation of the planes of unit U relative to the focal axis of the lens will change the background color of the transparent screen. A particular advantage of such procedure is that no colored lights need be used for such purpose as such colored light would upset the color balance of illuminating light from sources K in front of the objects being photographed. The unit U, further in such circumstances, secures full detail rendition in all glare-producing areas for the reasons hereinbefore mentioned.

Before actually exposing the plate, the photographer simply by rotating unit U on the camera, can view the ground glass G of the camera and secure the desired background color or color tone of the photograph.

Figure 4:
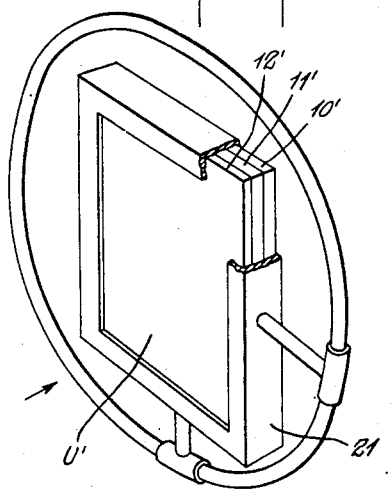
Fig. 4 is a perspective view of a modified form of spectral polarizer embodying the invention for use as a glare shield.

The unit U', (Fig. 4), identical structurally with unit U, can be used as a glare reducing visor on motor cars not only to eliminate ill effects of glare rays, but at the same time to produce a pleasing atmospheric tone changeable at will simply by rotation in its plane of the unit U'. When used as a visor the frame 21 bearing elements 10', 11' and 12' corresponding respectively with elements 10, 11 and 12, is mounted so that the polarizing element 10' faces inwardly and so that the unit U' in the frame 21 may be rotated in its plane.

Figure 5:
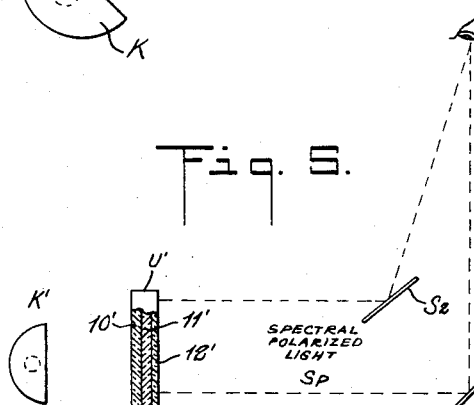
Fig. 5 is a diagrammatic view of another use for the device of Fig. 4.

If the unit U' is positioned in front of a light source K', Fig. 5, with the polarizer element 10' facing the said source, spectral polarized light Sp will emerge from the front face of unit U'. Such light Sp is white but produces colored reflections. The tints of these reflectors correspond to the hue of that color of the spectral polarized light striking the reflecting surface $S_1$, $S_2$ whose direction of polarization is parallel to the said surface since such color is more readily reflected than any other color of the spectral polarized light.

Thus it is also possible to secure unusual illumination effects by differently orienting surface areas $S_1$ and $S_2$ in the beam of spectrally polarized light Sp. These differently oriented areas $S_1$ and $S_2$ will then show different color reflections and they can be changed by rotation of the unit U' in its plane.

There are many other possible applications of the unit U. It may be combined with another polarizing element functioning as an analyzer to provide a universal selective color filter or several units U may be combined with an analyzer in various ways for use as compound selective universal color filters for various purposes.

For example, as shown in Fig. 6, a selective, continuous spectrum, spectral color filter is formed by combining an element U consisting of a polarizing element 10, ½ wave (475 or 625 millimicrons) retarding element 11 and ¼ wave (550 millimicron) retarding element 12, with a second polarizing element 23 functioning as an analyzer similar to polarizing element 10 but positioned in front of element 12. The analyzer 23 is made to be rotatable in its plane and is, for example, mounted on a support 24 for such rotational movement on the frame 13, rotation of the analyzer 23 in its plane through 180° will cause a spectral color succession of light transmitted from the unit U to the lens L. In other words, as the polarizing axis of the analyzer is rotated through an angle of 180° all the colors of the spectrum from purple or violet at one end to red at the other end of the color spectrum are transmitted in continuous spectral order by the element U to the lens L. Adjusting the polarizing axis of analyzer 23 to any desired angle in the 180° range causes a particular colored light and that colored light only to be transmitted. For example, if the angular disposition of the polarizing axis of analyzer 23 is at 45° with the polarizing axis of polarizing element 10 purple or violet light only is transmitted to the lens, and if at 15° blue, and so on, each angular change changing the color of the transmitted light to the lens. Appropriate indicia 26 on the support 24 and a reference mark 27 on the frame 13 provide reference for the user as to the relative angular disposition of the analyzer 23.

A compound filter CP₁ comprising two units U in conjunction with an analyzer is shown in Fig. 7. Therein the unit U₁ consists of a polarizing element 10₁, a ½ wave (475 or 625 millimicrons) retardation element 11₁, and ¼ wave (550 millimicrons) retardation element 12₁, a second identical unit U₂ positioned in axial alignment with the unit U₁, and an analyzing element 30 are mounted in independent portions 31, 32, 33 of a frame 34 so that the unit U₂ and analyzer 30 each may be rotated in its plane independently of each other. This compound filter CP₁ is mounted in front of a camera lens L with unit U₁ outermost. The use of the two elements U₁ and U₂ with the analyzer permits fine control of the transmission curve of light and affords very narrow band transmission in continuous spectral order with each succeeding hue very sharply defined making it possible to vary the absorption band which the compound filter produces. In other words, each hue transmitted by the compound filter CP₁ to the lens L of Fig. 7 can be more sharply defined than the corresponding hue transmitted by analyzer 23 to the lens L of Fig. 6 wherein only a single unit U is used.

The compound filter CP₁ therefore is particularly useful in lithography and in color photography as a correction filter, for dye filters and as a filter for making masks for color correction as well as for other photographic purposes.

Indicia 35 on the surface of frame portion 34 serve with reference to the operating arm 36 on frame portion 32, and indicia 37 on the surface of frame portion 32 with reference to the operating arm 38 on the frame portion 33 serve to indicate the particular color transmitted for each angular adjustment of unit U₂ relative to unit U₁ and element 30.

A second type of compound filter is illustrated in Fig. 8. In the latter figure, the unit U₃ consists of a polarizing element 10₃, a ½ wave (475 or 625 millimicron) length retardation element 11₃ and a ¼ wave (550 millimicron) length retardation element 12₃. An analyzer 40 is axially aligned with unit U₃ and a unit U₄ consisting of a ¼ wave length (550 millimicron) retardation element 12₄, a ½ wave length (475 or 625 millimicron) retardation element 11₄, and a polarizing element 10₄ in the order named, is positioned axially aligned with the unit U₃ and with analyzing element 40. In practice U₄ is simply a unit U₃ element in reversed position. The transmission axes of element 12₄ are at 90° with the axes of element 12₃, and transmission axes of element 11₄ at 90° with the axes of element 11₃. The transmission axes of elements 11₃ and 12₃ are at 45° with respect to each other. Likewise the transmission axes of elements 11₄ and 12₄ are at 45° with respect to each other. The two units U₃ and U₄ with analyzing element 40 between the two are supported in separate portions 41, 42 and 43 of a frame 44 in front of lens L of Fig. 8. Portions 41 and 43 are fixed to maintain the polarizing axes of polarizing elements 10₃ and 10₄ parallel and in the same direction. Portion 42 is rotatable relative to elements 41 and 43 to permit rotation clockwise or counterclockwise through 180° in its plane of analyzing element 40. A compound filter CP₂ constructed as described differs in its function and operation from the compound filter CP₁ of Fig. 7.

When the analyzer 40 is rotated in its plane a spectral succession from the violet to the red end of the spectrum will be transmitted to the lens L from element U₄. A narrower section of the spectrum from a beam of white light entering U₃, however, will be rendered in continuous spectral order than if only a single unit U were used. Thus the individual hues are more intense. Indicia 45 on the frame portion 44 serve with the operating arm 46 of the frame portion 42 to indicate the particular color transmitted for each angular adjustment of element 40.

The polarizing axes of elements 10₃ and 10₄ of units U₃ and U₄ may also be set at an angle to each other, and the size of that angle then determines the width of the absorption band which the compound filter CP₂ will produce, the relative width of the absorption band then remaining automatically constant for any given angle between the polarizing axes of U₃ and U₄ and moving from one end of the spectrum to the other end when the analyzer 40 is rotated in its plane 180°.

Therefore when CP₂ is set to produce an absorption band of given width the quantity of light which CP₂ will transmit from a beam of white light remains constant and only the color of the transmitted light changes when the analyzer 40 is rotated in its plane. Hence when the filter is used for photographic purpose the exposure factor does not change when the color of the filter is changed and must only be correlated with the (color) sensitivity of the photographic film or plate which is exposed through the compound filter CP₂.

If it is desired in any of the examples to orient the axes of the ½ wave retardation element at some other angle than 45° with the polarizing element, it is necessary to alter the nature of the ½ wave retardation element in order that the desirable characteristics of the described devices shall remain. For example, if the ½ wave retardation element axes are oriented at other than 45°, say at 40° or at 50° with the polarizing axis of the polarizing element, the ½ wave retardation element must be one for half the wave length of light of 490 millimicrons or 640 millimicrons instead of for 475 or 625 millimicrons. The ¼ wave retardation element remains the same, namely, for ¼ wave length light of 550 millimicrons but its transmission axes are oriented at 45° to the ½ wave element. The critical factors thus are both angle of orientation of the retardation elements and the particular strength thereof, i. e., their wave length factor. Optimum results occur when the orientation of the axes of the ½ wave length retardation element (475 or 625 millimicrons) is at 45° to the polarizing axis of the polarizing element and the ¼ wave length retardation element (550 millimicrons) has its axes at 45° to the said ½ wave element.

When compound filters are made up of the individual filters U, more than two may be combined together if desired, together with an analyzer or without the latter for production of a variety of novel optical effects.

The addition of each filter acts to render steeper intensity curves and, also, to change the transmission properties of the compound system.

While specific embodiments of the invention have been disclosed, variations in structural detail within the scope of the claims are possible and are contemplated. There is no intention, therefore, of limitation to the exact details shown and described.

What is claimed is:

1. In a device of the character described for producing spectrally polarized light, the combination comprising a polarizing element, a ½ wave length retardation element having a pair of transmission axes at right angles to each other, and a ¼ wave length retardation element for light of approximately 550 millimicrons wave length having a pair of transmission axes at right angles to each other, all elements being arranged in parallelism, said ½ wave length retardation element being for light of a wave length which is approximately 75 millimicrons different from that of the ¼ wave length retardation element, and in which the orientation between the transmission axes of the retardation elements is substantially 45°, and in which the polarizing axis of the polarizing element is oriented at substantially 45° with the transmission axes of the ½ wave length retardation element.

2. A device according to claim 1 in which the ½ wave length retardation element is for light of approximately 475 millimicrons wave length.

3. A device according to claim 1 in which the ½ wave length retardation element is for light of approximately 625 millimicrons wave length.

4. In a selective, continuous spectrum spectral color filter for producing all colors of the spectrum, the combination comprising a polarizing element having a polarizing axis, a ½ wave length retardation element having a pair of transmission axes at right angles to each other, a ¼ wave length retardation element for light of approximately 550 millimicrons wave length having a pair of transmission axes at right angles to each other, and an analyzer element, all elements being arranged in parallelism, said ½ wave length retardation element being for light of a wave length which is approximately 75 millimicrons different from that of the ¼ wave length retardation element, and said analyzer element being rotatable in its plane to provide transmission in spectral order of all colors of the spectrum through said elements from white light directed therethrough, and in which the orientation between the transmission axes of the two retardation elements is substantially 45°, and in which the polarizing axis of the polarizing element is oriented at substantially 45° with the transmission axes of the ½ wave length retardation element.

5. A device according to claim 4 in which the ½ wave length retardation element is for light of approximately 475 millimicrons wave length.

6. A device according to claim 4 in which the ½ wave length retardation element is for light of approximately 625 millimicrons wave length.

7. A compound filter of the character described comprising a plurality of selective continuous spectrum, color filter units aligned and each for producing all colors of the spectrum, each unit comprising a polarizing element having a polarizing axis, a ½ wave length retardation element having a pair of transmission axes at right angles to each other, a ¼ wave length retardation element for light of approximately 550 millimicrons wave length having a pair of transmission axes at right angles to each other, all elements being arranged in parallelism, said ½ wave length retardation element being for light of a wave length which is approximately 75 millimicrons different from that of the ¼ wave length retardation element, and in which the orientation between the transmission axes of the two retardation elements of each unit is substantially 45° and in which the polarizing axes of the polarizing element of each unit is oriented at substantially 45° with the transmission axes of the ½ wave length retardation element of the unit and an analyzer element aligned with the aligned units.

8. A device according to claim 7 in which the ½ wave length retardation element is for light of approximately 475 millimicrons wave length.

9. A device according to claim 7 in which the ½ wave length retardation element is for light of approximately 625 millimicrons wave length.

10. A device according to claim 7 in which the two of said units are aligned and in which said analyzing element is interposed between said two units and rotatable in its plane and in which the order of the elements of the second of the two units is reversed relative to that of the elements in the first of said units.

ALOIS E. K. STADLER.

REFERENCES CITED

The following references are of record in the file of this patent:

UNITED STATES PATENTS

| Number | Name | Date |
| --- | --- | --- |
| 2,011,544 | Rodman | Aug. 13, 1935 |
| 2,024,522 | Harrison | Dec. 17, 1935 |
| 2,163,530 | Thieme | June 20, 1939 |
| 2,184,999 | Land et al. | Dec. 26, 1939 |
| 2,313,831 | Martin | Mar. 16, 1943 |
| 2,350,892 | Hewson | June 6, 1944 |

OTHER REFERENCES

Wright, Text on Light, pages 307 to 309, published 1892 by McMillan & Co., New York, New York.

Johannsen, Text on Manual of Petrographic Methods, pages 348 to 350, published 1918, McGraw-Hill Book Co., 239 West 39th Street, New York, New York.